Patented Nov. 29, 1938

2,138,638

UNITED STATES PATENT OFFICE 2,138,638

ALLOYS

Robert H. Leach, Fairfield, Conn., assignor to Handy & Harman, New York, N. Y., a corporation of New York No Drawing. Application April 23, 1938,
Serial No. 203,825

7 Claims. (Cl. 75—173)

This invention relates to alloys for soldering and brazing purposes, and is concerned more particularly with a novel solder alloy especially adapted for uniting objects made of stainless steels or irons, which contain chromium, nickel, or both these constituents.

In the fabrication of articles of stainless steels and irons, considerable difficulty has been encountered in obtaining joints by soldering operations, which are sound and strong. Ordinary silver solders, which are widely and successfully used for other types of work, are not wholly satisfactory for the purpose and do not give the desired results, probably because they do not wet the stainless metal to the necessary degree.

In my copending application, Serial No. 203,824 filed on the same date as this one, I have disclosed a novel solder alloy for stainless steel and iron work, the use of which makes possible the production of joints which are strong and free of porosity, and this alloy has the further advantage that its color closely approximates the stainless material. The alloy referred to, however, contains some zinc, and for some purposes, as, for example, in brazing under vacuum, and also in apparatus intended for certain chemical uses, the presence of even a small amount of zinc in the solder is objectionable.

The present invention is, accordingly, directed to the provision of a novel solder alloy especially suited for use with stainless steels and irons which produces strong, non-porous joints, and contains no zinc.

The new alloy comprises a substantial proportion of silver and less amounts of other metals, the ranges of proportions of the ingredients being approximately as follows:

| | Per cent |
|---|---|
| Silver | 40 to 70 |
| Copper | 20 to 50 |
| Manganese | 5 to 15 |
| Nickel | 2 to 7.5 |
| Silicon | 0.15 to 0.40 |

The new alloy will ordinarily contain a preponderating amount of silver, and my experimental work has indicated that if the flow point temperature required for a specific use must be kept down, as below about 1500° F., it is preferable to employ the allow in a form containing at least 50% silver. In some cases, where a higher temperature is not important, a less amount of silver may be used, and this reduces the cost.

The copper employed imparts malleability, ductility, and toughness, and it is cheaper than the silver but tends to give the alloy a yellow color. In those cases where color is an important consideration, it is desirable to keep the copper content toward the lower end of the range. The nickel counteracts the tendency of the copper to color the alloy and, in addition, increases the resistance of the alloy to certain types of corrosion, as, for example, chloride attack. Also, the presence of the nickel appears to impart to the alloy the characteristic of wetting surfaces of stainless steel and iron.

The presence of silicon within the range specified results in the production of joints free of porosity, but an increase in the silicon above the upper limit mentioned, does not produce a further improvement in the characteristics of the alloy and, in fact, appears to be detrimental in some respects. Preferably, the silicon will be present in the amount of 0.25% and may be added in the form of 20% silicon-copper.

Specific examples of the new alloy, which have been found to give satisfactory results in connection with stainless steels and irons, have the following approximate formulae:

*Example No. 1*

| | Per cent |
|---|---|
| Silver | 40 |
| Copper | 45.75 |
| Manganese | 10 |
| Nickel | 4 |
| Silicon | 0.25 |

The alloy of Example No. 1 has a melting point of 1375° F. and a flow point of 1585° F.

*Example No. 2*

| | Per cent |
|---|---|
| Silver | 50 |
| Copper | 35.75 |
| Manganese | 10 |
| Nickel | 4 |
| Silicon | 0.25 |

The alloy of Example No. 2 has a melting point of 1375° F. and a flow point of 1440° F.

*Example No. 3*

| | Percent |
|---|---|
| Silver | 55 |
| Copper | 30.75 |
| Manganese | 10 |
| Nickel | 4 |
| Silicon | 0.25 |

The alloy of Example No. 3 has a melting point of 1375° F. and a flow point of 1425° F.

*Example No. 4*

| | Percent |
|---|---|
| Silver | 60 |
| Copper | 25.75 |
| Manganese | 10 |
| Nickel | 4 |
| Silicon | 0.25 |

The alloy of Example No. 4 has a melting point of 1375° F. and a flow point of 1465° F.

Joints of stainless steel and iron objects made with the new solder in the analyses given have good strength, are free of porosity, and because of the absence of zinc may be used in applications where the tendency of the zinc to volatilize is objectionable.

I am aware that both manganese and nickel have been used in making silver brazing alloys, but the new alloy containing the ingredients specified, within the ranges of proportions mentioned, possesses advantages over others with which I am acquainted, for use with stainless steels and irons.

I claim:

1. An alloy which consists of silver from about 40% to about 70%, copper from about 20% to about 50%, manganese from about 5% to about 15%, nickel from about 2% to about 7.5%, and silicon from about 0.15% to about 0.40%.

2. An alloy which consists of silver from about 40% to about 50%, copper from about 35.75% to about 45.75%, manganese from about 5% to about 15%, nickel from about 2% to about 7.5%, and silicon from about 0.15% to about 0.40%.

3. An alloy which consists of silver from about 50% to about 55%, copper from about 30.75% to about 35.75%, manganese from about 5% to about 15%, nickel from about 2% to about 7.5%, and silicon from about 0.15% to about 0.40%.

4. An alloy which consists of silver from about 55% to about 60%, copper from about 25.75% to about 30.75%, manganese from about 5% to about 15%, nickel from about 2% to about 7.5%, and silicon from about 0.15% to about 0.40%.

5. An alloy which consists of about 50% silver, about 35.75% copper, about 10% manganese, about 4% nickel, and about 0.25% silicon.

6. An alloy which consists of about 55% silver, about 30.75% copper, about 10% manganese, about 4% nickel, and about 0.25% silicon.

7. An alloy which consists of about 60% silver, about 25.75% copper, about 10% manganese, about 4% nickel, and about 0.25% silicon.

ROBERT H. LEACH.